United States Patent
Poggi et al.

(10) Patent No.: US 6,392,033 B1
(45) Date of Patent: May 21, 2002

(54) METHOD FOR VISCOSE PRODUCTION

(75) Inventors: Tatjana Poggi, Saal; Geza Hidasi, Regensburg, both of (DE)

(73) Assignee: Acordis Kelheim GmbH, Kelheim (DE)

( * ) Notice: Subject to any disclaimer, the term of this patent is extended or adjusted under 35 U.S.C. 154(b) by 0 days.

(21) Appl. No.: 09/367,354

(22) PCT Filed: Feb. 10, 1998

(86) PCT No.: PCT/EP98/00729

§ 371 Date: Aug. 12, 1999

§ 102(e) Date: Aug. 12, 1999

(87) PCT Pub. No.: WO98/38221

PCT Pub. Date: Sep. 3, 1998

(30) Foreign Application Priority Data

Feb. 25, 1997 (DE) .......................... 197 07 387

(51) Int. Cl.⁷ .............................. C08B 9/00; C08B 9/02; C08B 9/06
(52) U.S. Cl. .......................... 536/56; 536/60; 536/124; 536/127
(58) Field of Search ............................ 536/56, 60, 124, 536/127

(56) References Cited

U.S. PATENT DOCUMENTS 3,635,670 A * 1/1972 Kennedy
3,728,330 A * 4/1973 Sihtola et al.
4,163,840 A * 8/1979 Geyer, Jr. et al.

FOREIGN PATENT DOCUMENTS

DE 11 51 494 B 7/1963
DE 29 41 624 A 5/1980

OTHER PUBLICATIONS

"Ullman's Encyclopedia of Industrial Chemistry," vol. A5, pp. 401–404, 1986.
Ullmans Encyklopadie der technischen Chemie, Dritte Auflage, 1967, Band 18, Seite 151.

* cited by examiner

Primary Examiner—Gary Geist
Assistant Examiner—Everett White
(74) Attorney, Agent, or Firm—Oliff & Berridge, PLC

(57) ABSTRACT

A process for producing viscose wherein the caustic soda used previously in the alkalization of electron-untreated cellulose can be used in the alkalization of electron-treated cellulosic material, provided the level of dispersed solids in the caustic soda does not exceed 0.16 g/l.

17 Claims, No Drawings

METHOD FOR VISCOSE PRODUCTION

BACKGROUND OF THE INVENTION

1. Field of the Invention

The present invention relates to an improved process for producing viscose.

2. Description of Related Art

The production of viscose from cellulosic materials is well known. An extensive description of this technology may be found, for example, in K. Götze, Chemiefasern nach dem Viskoseverfahren, Springer-Verlag, 3rd edition (1967) and in the chapter "Viscosereyon, -spinnfasern, -schwämme" in Ullman's Enzyklopädie der technischen Chemie, Volume 18, pages 131–177, and Volume 9, pages 213–222.

The individual steps of the viscose process can briefly be summarized as follows:

Chemical pulp or some other suitable cellulosic raw material is treated with an aqueous solution of caustic soda whose concentration is customarily between 18 and 22% to obtain alkali cellulose. Today, the alkalization is predominantly carried out by steeping. The cellulosic raw material is dispersed in the aqueous caustic soda solution in a vessel or vessel system equipped with suitable dispersing means. Alkali cellulose forms. The dispersion formed is frequently also referred to as the steep and generally has a solids content of 2–6%. The excess liquid is removed in roll or belt presses to isolate the alkali cellulose formed. Alkali cellulose comprises about 30–36% of cellulosic material, about 15–20% of NaOH and water. The removed caustic soda is then recycled into the steeping step. The addition of fresh caustic soda and the removal of a bleed stream maintain the composition in this caustic recycle system consistently at the desired values.

The isolated alkali cellulose is aged, i.e., exposed to the action of air, to achieve some oxidative degradation which depolymerizes the cellulose molecules to a suitable chain length for the rest of the process. This aging step requires a residence time of up to 1.5 days.

The foregoing alkalization of the cellulose can also be effected by steeping electron-treated cellulosic material in alkali. This electron treatment of the cellulosic material is described in detail, for example, in DE-A-2,941,624. There it is proposed that pulp be treated with 1–30 kGy electron beams before use for viscose production. This leads to better processing economics, since electron-treated cellulosic material can be alkalized by means of more dilute caustic soda (concentrations of less than 18%) than is possible in the case of untreated cellulose, so that caustic soda consumption distinctly diminished. At the same time, the carbon disulfide reactivity of the cellulose improves. With correct control of the electron treatment, the chain length of the cellulose can be adjusted to a value at which a further aging step becomes superfluous. The increased reactivity opens up the prospect of reducing the consumption of carbon disulfide.

The alkali cellulose is then reacted with carbon disulfide. This xanthation turns the alkali cellulose into a cellulose xanthate. The reaction typically involves 3 hours at temperatures of about 25 to 30° C., and a carbon disulfide quantity which typically amounts to 28 to 32% by weight of the cellulosic material present in the alkali cellulose. The resulting cellulose xanthate is obtained as a crumbly yellowish orange mass.

The cellulose xanthate is subsequently dissolved in dilute caustic soda. It is this solution of cellulose xanthate in caustic soda which is known as viscose.

The viscose is allowed to stand at about ambient temperature for several hours to ripen. During this time, the xanthate groups become distributed along the cellulose chains. During the ripening time, other process steps such as filtration and deaeration are carried out as well.

To produce shaped structures, for example fiber, the ripened viscose is forced through small orifices into a spin bath. The spin bath is typically acid in character and customarily comprises sulfuric acid (about 10%), sodium sulfate (about 20%) and also small amounts of zinc sulfate (about 1%). The spin bath coagulates the viscose to form fiber. At the same time as the coagulation, the cellulose is regenerated from the cellulose xanthate. The regenerated fibrous cellulose product is then cut, washed to remove concomitants and impurities, and dried.

The properties of the products can be influenced within limits through variation of the process parameters of viscose production and of spinning.

A very significant cost factor for making products composed of viscose is the consumption of chemicals such as carbon disulfide, caustic soda and sulfuric acid. However, there are technical limits to reducing the consumption of chemicals. If the amount of carbon disulfide and/or caustic soda used drops below certain limits, the filterability of the viscose deteriorates, but good viscose filterability is an absolute must for the entire process to be economically feasible.

In the past, there have been repeated attempts to improve the economics of the viscose process by reducing the consumption of chemicals. One possible way is to use electron-treated pulp.

Although electron-treated pulp may be used for the entire production, a production plant may be faced with the need to use normal, untreated pulp as well to some extent. As explained above, alkali cellulose prepared from electron-treated cellulose no longer has to be aged, so that it cannot be mixed with alkali cellulose prepared from untreated cellulose until after the aging thereof.

In certain cases, it can be useful or necessary to keep the two types of alkali cellulose product separate through to the finished product. In both cases, however, it is economically advantageous to carry out the alkalization with a common caustic system. Not only is the equipment simpler, but the simpler processing procedure is another point in favor of this solution. However, if electron-treated pulp is alkalized using the same caustic previously used to alkalize the untreated pulp, incompatibility becomes apparent as a dramatic deterioration in the filterability of the viscose produced. This is documented by Example 1 described below.

There is therefore a need for a process for producing viscose in which electron-treated cellulosic material can be alkalized using a caustic previously used in the alkalization of untreated cellulose and which does not give rise to the above-described incompatibility. The use of a common caustic system for both sources of raw material constitutes a further improvement in the economics of viscose production, since separate handling of the alkalizing caustic can be dispensed with.

SUMMARY OF THE INVENTION

It has now been found that, surprisingly, the above-described incompatibility of the caustic system can be avoided if the caustic obtained from the alkalization of the untreated cellulose is subjected to a treatment whereby dispersed solids present in the caustic are substantially removed before use in the alkalization of electron-treated cellulose. A viscose thus produced has an acceptable filter value for industrial production.

DETAILED DESCRIPTION OF PREFERRED EMBODIMENTS

The present invention accordingly provides a process for producing viscose, which comprises the steps of:

a) dispersing electron-treated cellulosic material in an aqueous solution of caustic soda in a conventional manner, b) removing excess caustic soda from the resulting alkali cellulose in a conventional manner, c) xanthating the alkali cellulose obtained as per step b) by reaction with carbon disulfide in a conventional manner, d) dissolving the cellulose xanthate formed as per step c) in an aqueous solution of a lye in a conventional manner, wherein the caustic soda used in step a) was previously used in the alkalization of electron-untreated cellulose and treated in such a way that the level of dispersed solids in the caustic does not exceed 0.16 g/l.

Dispersed solids for the purposes of the present invention are undissolved impurities present in the caustic soda which result from the alkalization of electron-untreated cellulose. The caustic soda previously used in the alkalization of electron-untreated cellulose is also known as plant caustic. It, if necessary, is adjusted before step a) to the requisite concentration by dilution or addition of fresh caustic soda. The dispersed solids in the plant caustic are determined by filtering a defined quantity of the plant caustic through a G3 glass frit and then effecting a quantitative determination of the filter cake.

The electron-treated cellulosic material used as per step a) is preferably a cellulosic material which has been treated with an electron beam dose of 1 to 30 kGy. The electron-treated cellulose preferably comprises at least 85% by weight, especially 90 to 98% by weight, of alpha-cellulose.

The electron-treated cellulosic material is alkalized by reaction with an aqueous solution of caustic soda previously used in the alkalization of electron-untreated cellulose. What is essential is that said aqueous solution of caustic soda was subjected to a treatment so that the level of dispersed solids in the caustic soda does not exceed 0.16 g/l. This can be accomplished by working up the caustic using techniques known to one skilled in the art.

Suitable measures include, for example, filtration, centrifugation, sedimentation or equivalent solid/liquid separation techniques. The concentration of the caustic soda is customarily between 14 and 20% by weight of NaOH, especially between 15 and 17% by weight of NaOH. The concentration of the aqueous solution of caustic soda used is adjusted by addition of water and/or caustic soda.

Then excess caustic soda is removed. This can be accomplished, for example, by pressing, centrifugation or other suitable measures. The alkali cellulose present as per step b) customarily comprises 28 to 38% by weight, preferably between 30 and 35% by weight, of cellulose and between 12 and 18% by weight, preferably 14 to 17% by weight, of caustic soda (NaOH). The degree of polymerization (DP) of the alkali cellulose is between 200 and 500, preferably 250 and 400. The degree of polymerization is determined by viscometry of a solution of alkali cellulose in an aqueous metal/amine complex as per TAPPI Standard T 206.

The xanthation of the alkali cellulose (step c) is effected by reaction with 15 to 35%, preferably 15 to 25%, of carbon disulfide. The xanthation customarily takes place at room temperature or slightly elevated temperature.

The cellulose xanthate formed is then dissolved with an aqueous lye. The aqueous lye used is preferably caustic soda. The resulting basic solution of the cellulose xanthate is known as viscose. It customarily comprises 7 to 11% by weight, preferably 8 to 10% by weight, of cellulose and 3 to 8% by weight, preferably 3.8 to 5% by weight, of NaOH. In addition to these constituents, the viscose may further comprise additives to improve the spinnability of the viscose, for example. Especially glycol like and aminic modifiers may be mentioned here.

The viscose can then be used in a conventional manner to produce shaped structures, for example fiber or film, which likewise forms part of the subject-matter of the present invention. Here the cellulose is regenerated from the cellulose xanthate.

The viscose is subjected to a filtration prior to the shaping process. The filtration will reveal the above-described incompatibility in the case of the use of caustic sodas whose level of dispersed solids is more than 0.16 g/l, i.e., the viscose has a filter value of more than 700.

The Examples which follow illustrate the present invention:

EXAMPLE 1

300 g of electron-treated viscose pulp were steeped with alkalizing caustic (200 g/l of NaOH) from an industrial-scale production plant (use of untreated cellulose/plant caustic) and then adjusted to a composition of 32.5% of cellulose and 15.2% of NaOH by centrifugation. The resulting alkali cellulose was xanthated with 28% of carbon disulfide (based on the cellulose content). Dissolving with dilute caustic soda resulted in the viscose properties shown hereinafter in the "Plant caustic" column.

A comparative viscose was produced in the same way using freshly made-up alkalizing caustic of the same concentration. The properties of this viscose are shown in the "Fresh caustic" column of TABLE 1 below.

TABLE 1

|  | Plant caustic | Fresh caustic |
| --- | --- | --- |
| Cellulose in viscose, in % | 9.0 | 9.0 |
| NaOH in viscose, % | 4.0 | 4.0 |
| Filter value | 2040 | 152 |

The filter value used here to characterize the filterability is predictive of the following plant filterability shown in TABLE 2 below:

TABLE 2

| Filter value | Plant filterability |
| --- | --- |
| <400 | very good |
| 400–500 | good |

TABLE 2-continued

| Filter value | Plant filterability |
|---|---|
| 500–600 | moderate |
| 600–700 | poor |
| >700 | unfilterable |

The results show that the use of a plant alkalizing caustic, i.e., of a caustic previously used in the alkalization of untreated cellulose and subsequently not filtered, leads to an unfilterable viscose. The process of the present invention provides a solution for conjoint utilization of one alkalizing system for untreated and electron-treated pulp.

It was found, then, that, surprisingly, the abovementioned incompatibility documented in Example 1 is attributable to dispersed solids in the plant alkalizing caustic, which are removable, for example by mechanical filtration. If the plant alkalizing caustic is increasingly closely filtered before use for alkalizing electron-treated pulp, increasingly better filtration properties are obtained for the viscose produced, as shown by the series of runs of Example 2.

EXAMPLE 2

For each run, 300 g of electron-treated viscose pulp were steeped with alkalizing caustic (190 g of NaOH /l) from an industrial-scale production plant (use of untreated cellulose/ plant caustic) and filtered to different degrees before use, so that different concentrations of dispersed solids remain in the caustic. The resulting alkali cellulose was then centrifuged to a composition of 31.8–32.2% of cellulose and 16.2–16.4% of NaOH and xanthated with 22% of carbon disulfide (based on the cellulose content). Dissolving with dilute caustic soda produced viscoses having a cellulose content of 8.9–9.0% and an NaOH content of 4.0–4.1%. The degree of filtration was measured in terms of the concentration of admixtures still removable from the alkalizing caustic using a G3 glass frit. The results are shown in TABLE 3 below.

TABLE 3

| Run No. | Admixtures in alkalizing caustic (g/l) | Filter value |
|---|---|---|
| 1 | 1.25 | 5680 |
| 2 | 0.46 | 945 |
| 3 | 0.28 | 739 |
| 4 | 0.16 | 498 |
| 5 | 0.03 | 247 |
| 6 | 0.008 | 193 |
| 7 | 0.002 | 196 |
| 8 | 0.000 | 170 |

The filterability of the viscoses can be judged against the scale reported in Example 1.

The results show that, when the caustic used for alkalizing comprises a dispersed solids content of 0.28 g/l, the viscose produced therewith is no longer filterable on an industrial scale. Good filtration properties are only achievable when the level of filter-removable solids does not exceed 0.16 g/l.

What is claimed is:

1. A process for producing viscose, which comprises the steps of:

a) treating cellulosic material with electrons to manufacture an electron-treated cellulosic material;

b) dispersing the electron-treated cellulosic material in an aqueous solution of caustic soda to produce an alkali cellulose;

c) removing excess caustic soda from the alkali cellulose;

d) xanthating the alkali cellulose obtained in step c) by reaction with carbon disulfide to produce cellulose xanthate; and e) dissolving the cellulose xanthate formed in step d) in an aqueous solution of a lye, wherein the caustic soda used in step b was previously used in the alkalization of electron-untreated cellulose and treated such that the level of dispersed solids in the caustic soda does not exceed 0.16 g/l.

2. The process of claim 1, wherein the caustic soda used in step b) has a concentration that corresponds to 14 to 20% by weight of NaOH.

3. The process of claim 1, wherein the level of dispersed solids in the caustic soda used in step b) is determined by filtration.

4. The process of claim 1, wherein the caustic soda used in step b) comprises not more than 0.03 g/l of dispersed solids.

5. The process of claim 1, wherein the caustic soda used in step b) is treated by at least one of filtration and centrifugation.

6. A process for producing viscose, which comprises the steps of:

a) providing caustic soda previously used in the alkalization of electron-untreated cellulose, the caustic soda having a level of dispersed solids not exceeding 0.16 g/l;

b) treating cellulosic material with electrons to manufacture an electron-treated cellulosic material;

c) dispersing the electron-treated cellulosic material in an aqueous solution of the caustic soda to produce an alkali cellulose;

d) removing excess caustic soda from the alkali cellulose;

e) reacting the alkali cellulose obtained in step d) with carbon disulfide to produce cellulose xanthate; and f) dissolving the cellulose xanthate formed in step e) in an aqueous solution.

7. The process of claim 6, wherein the caustic soda used in step c) has a concentration that corresponds to 14 to 20% by weight of NaOH.

8. The process of claim 6, wherein the level of the dispersed solids in the caustic soda is determined by filtration.

9. The process of claim 6, wherein the caustic soda provided in step a) comprises not more than 0.03 g/l of dispersed solids.

10. The process of claim 6, wherein prior to step a) the caustic soda previously used in the alkalization of electron-untreated cellulose is treated by at least one of filtration and centrifugation.

11. The process of claim 6, wherein the aqueous solution used in step f) comprises a lye.

12. A process for producing viscose, which comprises the steps of:

a) alkalizing electron-untreated cellulose in a caustic system;
b) treating caustic soda previously used in step a) such that the caustic soda has a level of dispersed solids not exceeding 0.16 g/l;
c) treating cellulosic material with electrons to manufacture an electron-treated cellulosic material;
d) dispersing the electron-treated cellulosic material in an aqueous solution of the caustic soda in the caustic system to produce an alkali cellulose;
e) removing excess caustic soda from the alkali cellulose;
f) reacting the alkali cellulose obtained in step e) with carbon disulfide to produce cellulose xanthate; and
g) dissolving the cellulose xanthate formed in step f) in an aqueous solution.

13. The process of claim 12, wherein the caustic soda used in step d) has a concentration that corresponds to 14 to 20% by weight of NaOH.

14. The process of claim 12, wherein the level of the dispersed solids in the caustic soda is determined by filtration.

15. The process of claim 12, wherein the caustic soda used in step d) comprises not more than 0.03 g/l of dispersed solids.

16. The process of claim 12, wherein step b) comprises treating the caustic soda previously used in step a) by at least one of filtration and centrifugation.

17. The process of claim 1, wherein the aqueous solution used in step g) comprises a lye.

* * * * *